1,613,577

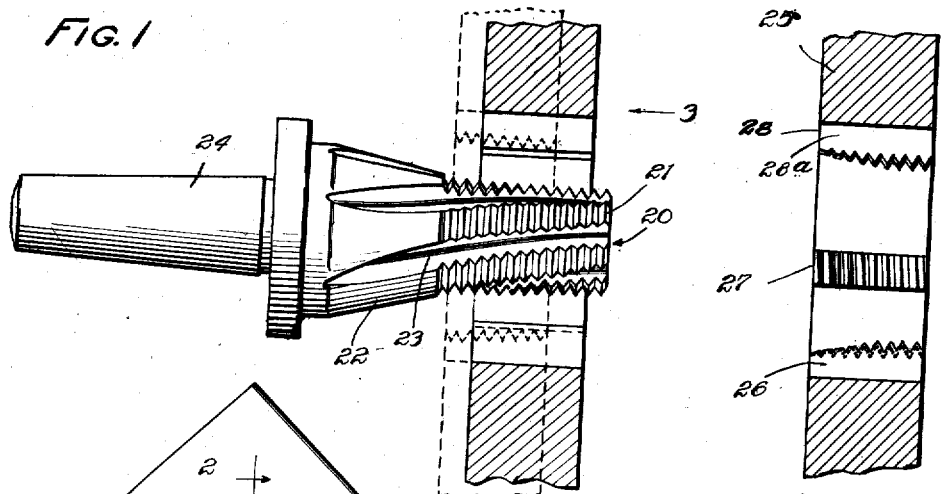
FIG. 1
FIG. 2
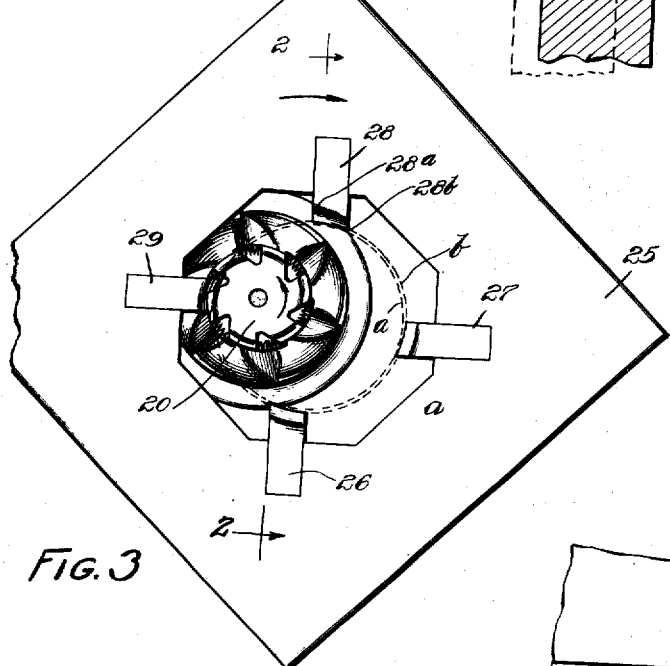
FIG. 3
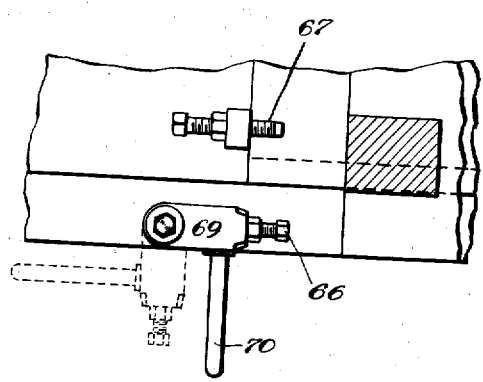
FIG. 4
Inventor
Joseph C. Fletcher Jan. 4, 1927.
J. C. FLETCHER
1,613,577
DIE CUTTING MACHINE
Filed Dec. 6, 1923    5 Sheets-Sheet 5
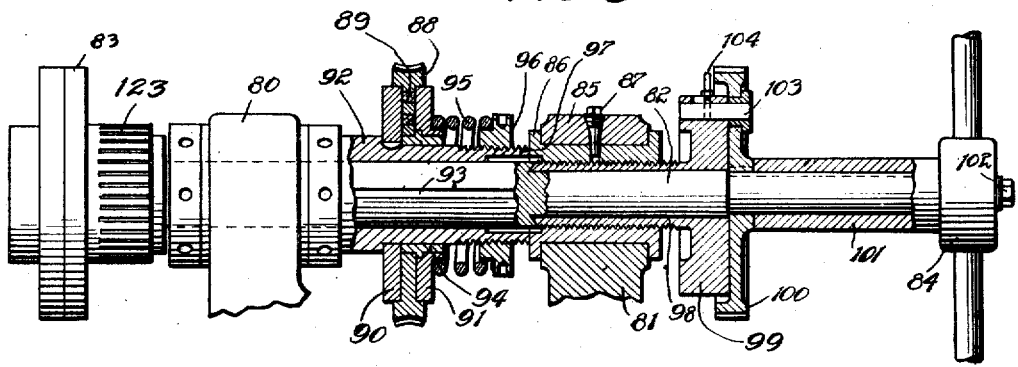
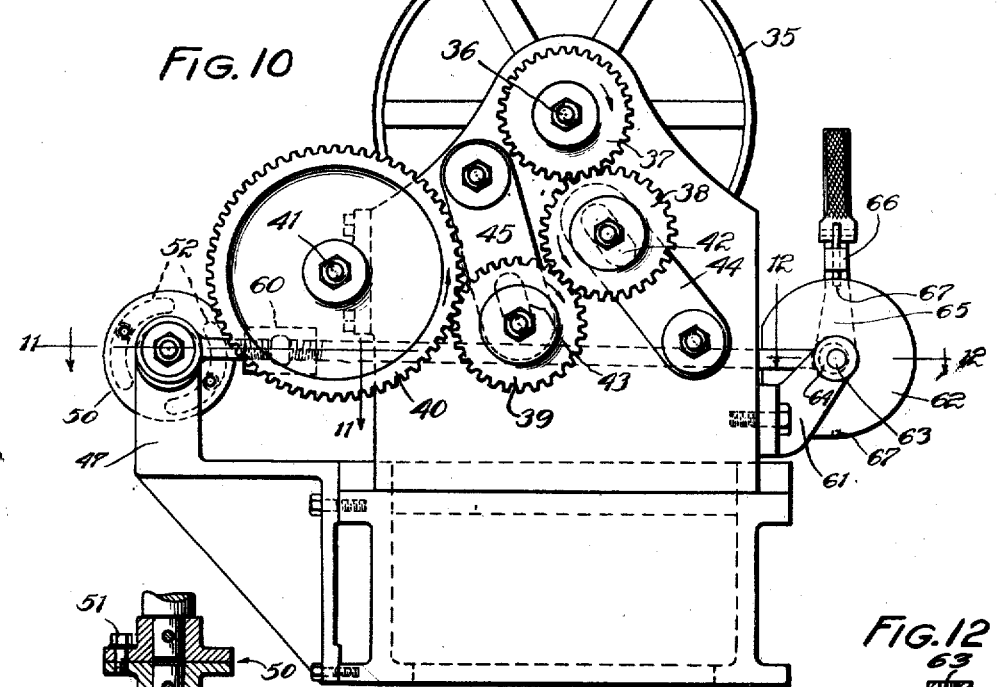
Inventor
Joseph C. Fletcher
By Churchill Parker Railson
Attys Patented Jan. 4, 1927.

UNITED STATES PATENT OFFICE.

JOSEPH C. FLETCHER, OF CHICAGO, ILLINOIS, ASSIGNOR TO ARMSTRONG BROS. TOOL CO., OF CHICAGO, ILLINOIS, A CORPORATION OF ILLINOIS.

DIE-CUTTING MACHINE.

Application filed December 6, 1923. Serial No. 678,848.

This invention relates generally to die hobbing machines, and more particularly to one for hobbing and chamfering by the same tool.

One object is to provide a tool of the hobbing type combined with a suitable cutter for chamfering.

Another object is to provide mechanism for using such a tool to cut back or relieve the die.

Still another object is to provide a simple construction for feeding the work onto the tool.

Another object is to provide a method for withdrawing the hob from engaging the die teeth during the process of chamfering.

Still another object is the provision in the machine of suitable mechanism to permit cutting of left and right hand threads without varying the operation of the machine.

The method employed in the disclosed embodiment of my invention for hobbing and chamfering, is to control the axial feeding of the rotating work, and to reciprocate a rotating tool in a plane perpendicular to its axis of rotation, the reciprocation of the tool and the rotation of the work being in timed relation to each other.

The tool employed in my invention may be of several types. Preferably it embodies a hob portion to cut the threads, which portion may be straight or tapered, and a bevel or tapered cutter portion of larger diameter than the hob, for chamfering.

The reciprocation of the tool is timed by the rotation of the work in such a manner that as the tool forms each portion of the die, it cuts progressively deeper to produce the relief required in the die. Further, the length of the path of reciprocation is normally fixed, but the path as a whole with relation to the work may be offset in order that the hob portion of the tool may clear the cutters in the die to permit the larger portion of the tool to chamfer the die, and likewise relieve the chamfered portion.

The axial feeding of the work is automatically controlled by the rotation thereof in order to produce the required pitch. According to the type of tool employed, the feeding of the work may be automatic and continuous for hobbing, suitable adjustments being provided in a machine embodying my invention, to permit chamfering before or after the hobbing process, while the tool is offset, and thus free from contacting the teeth of the die as in the above mentioned hobbing process.

In a machine embodying my invention many features may be incorporated to facilitate automatic operation for rapid production. Such a machine may be constructed specially for the results desired. I have explained that my invention may use a variety of forms of tools and that the process may be operated in a variety of ways, more especially related to the type of tool chosen for the work and the type of thread desired. In order to explain my invention and the various manners in which it may be employed, I have shown in the drawings one form of machine embodying the principles of the invention.

In the drawings:

Fig. 1 shows a fragmentary cross-section through an uncut die blank.

Fig. 2 is a fragmentary cross-section along the line 2—2 of Fig. 3 of the completed die showing one insert in elevation and two in profile.

Fig. 3 shows a view of Fig. 1 looking in the direction of the arrow 3.

Fig. 4 illustrates a detail of a movable temporary stop for the work slide.

Fig. 9 is a vertical section along the line 9—9 of Fig. 6.

Fig. 10 shows a left end view of the machine as positioned in Fig. 5.

Fig. 11 is a cross-sectional view of the eccentric mechanism of Fig. 10 along the line 11—11.

Fig. 12 is likewise a sectional view of the offsetting eccentric of Fig. 10 along the line 12—12.

Figure 5:
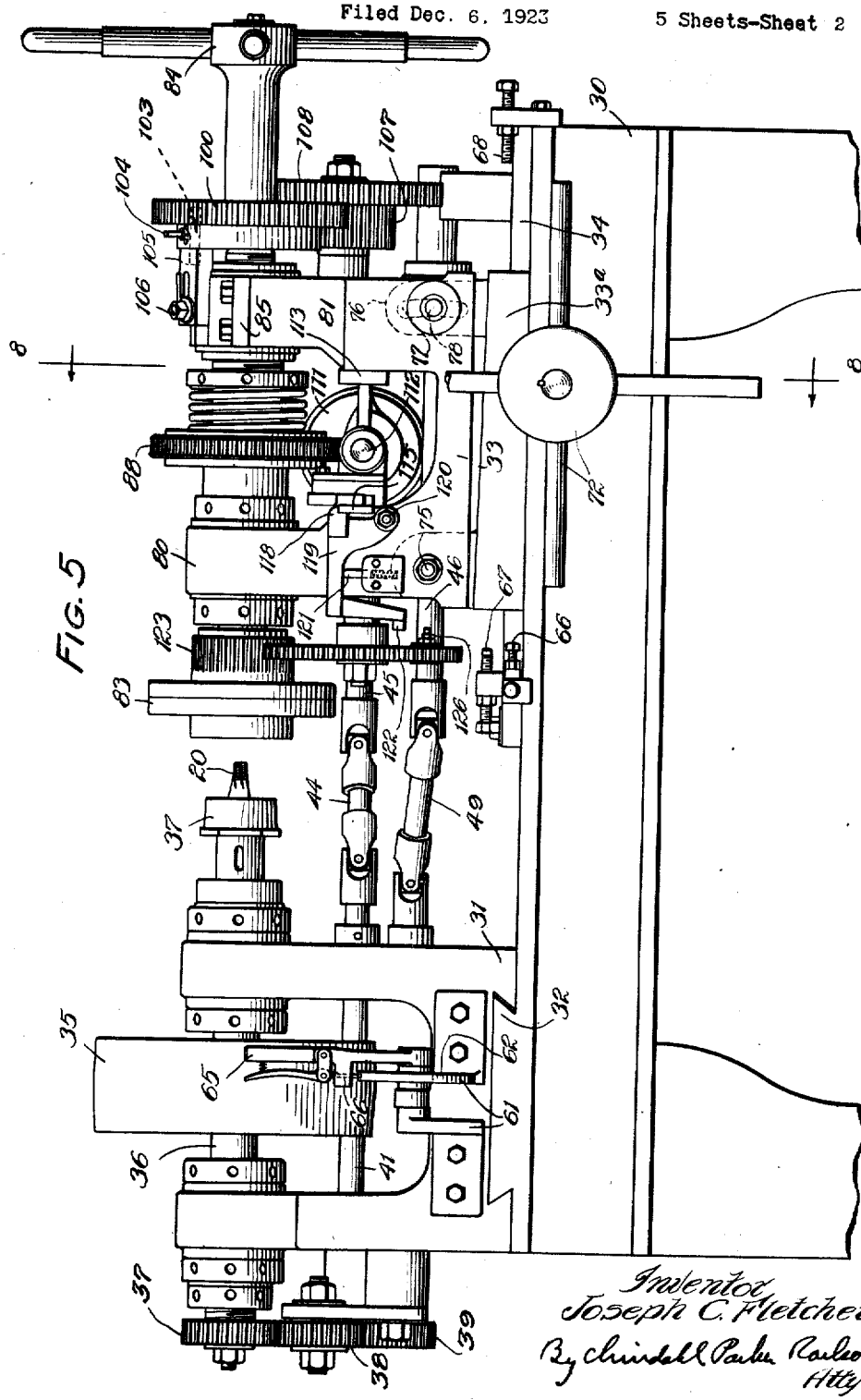
Fig. 5 shows a front view of the whole machine.

In Fig. 1 I have illustrated a spirally gashed tool 20 which has a slightly tapered portion 21 with a multiplicity of annular cutter teeth. The tapered cutting portion 22 is a chamfering tool, the two portions forming a unitary rotary tool, the spiral gashes 23 being common to both portions of the tool. Any suitable means for securing the tool for rotation may be employed, as the usual spindle shank 24.

Fig. 2 shows the die 25 of Fig. 3 in section along the line 2—2. The die for which my invention is particularly adapted is any die presented a number of cutting tools in circumferential arrangement. The die 25 has four of these tools, or inserts as they are called, 26, 27, 28. and 29. These are tool steel cast into the block 25 in the arrangement shown. Fewer or more of these may be used, but four are shown herein. In Fig. 2 the insert 26 shows the profile of the finished work and insert 28 indicates the same, the teeth in the face 28a (Figs. 2 and 3) being more remote from the center of the die than those in the face 28b (Fig. 3), whereby the required relief is obtained. The dotted lines a and b (Fig. 3) represent arcs in the circular path of the front and back portions of a finished tooth in the inserts.

Fig. 3 indicates the horizontal reciprocation of the tool 20. During the time that the insert 29 passes the cutter. with the die 25 rotating in the direction of the arrow, the tool 20 moves outwardly towards the left, so that it first cuts the insert at circle a and leaves the insert cutting on circle b. While the space between the inserts passes the tool the tool moves inwardly to a position from which it can advance into the next approaching insert. Thus in one revolution of the die 25, the tool reciprocates as many times as there are inserts in the die.

The feeding of the work onto the tool gives the required pitch. In addition to the relative longitudinal motion. the machine described provides mechanism to move the tool inwardly towards the center of the die to clear the inserts. whereupon there is permitted a more rapid feed upon the larger chamfering portion 22 of the tool 20. In the offset position, the chamfering may be done first and the hobbing second. Thus the machine may be constructed to alternate the sequence of the operations on successive blanks.

In the machine described. there is mechanism for doing this in one direction. In Fig. 5 the machine referred to comprises generally the frame 30, the horizontally movable tool slide 31 on ways 32 and the longitudinally movable work slide 33 on ways 34. The tool carrying slide 31 receives power direct by pulley 35 on a main shaft or spindle 36 in the end of which a suitable holder 37 grasps the tool 20. Fig. 10 shows the end view of this slide with the gear train 37, 38, 39, 40 from the shaft 36 to a shaft 41 at the rear of the head 31. The gears 38 and 39 are secured in slots 42 and 43 in the pivoted arms 44 and 45 respectively. so that other speed ratios may be obtained by substitution in the gear train.

Power is transmitted to the work slide 33 by the shaft 41 through the universal joint 44 on shaft 45 in the work slide. Connections to be later described transmit power from the work slide through shaft 46 to a suitable mechanism causing the reciprocation of the tool slide 31. For this purpose I have provided an eccentric device herein shown as a crank the details of which may be varied from the following description.

Figure 6:
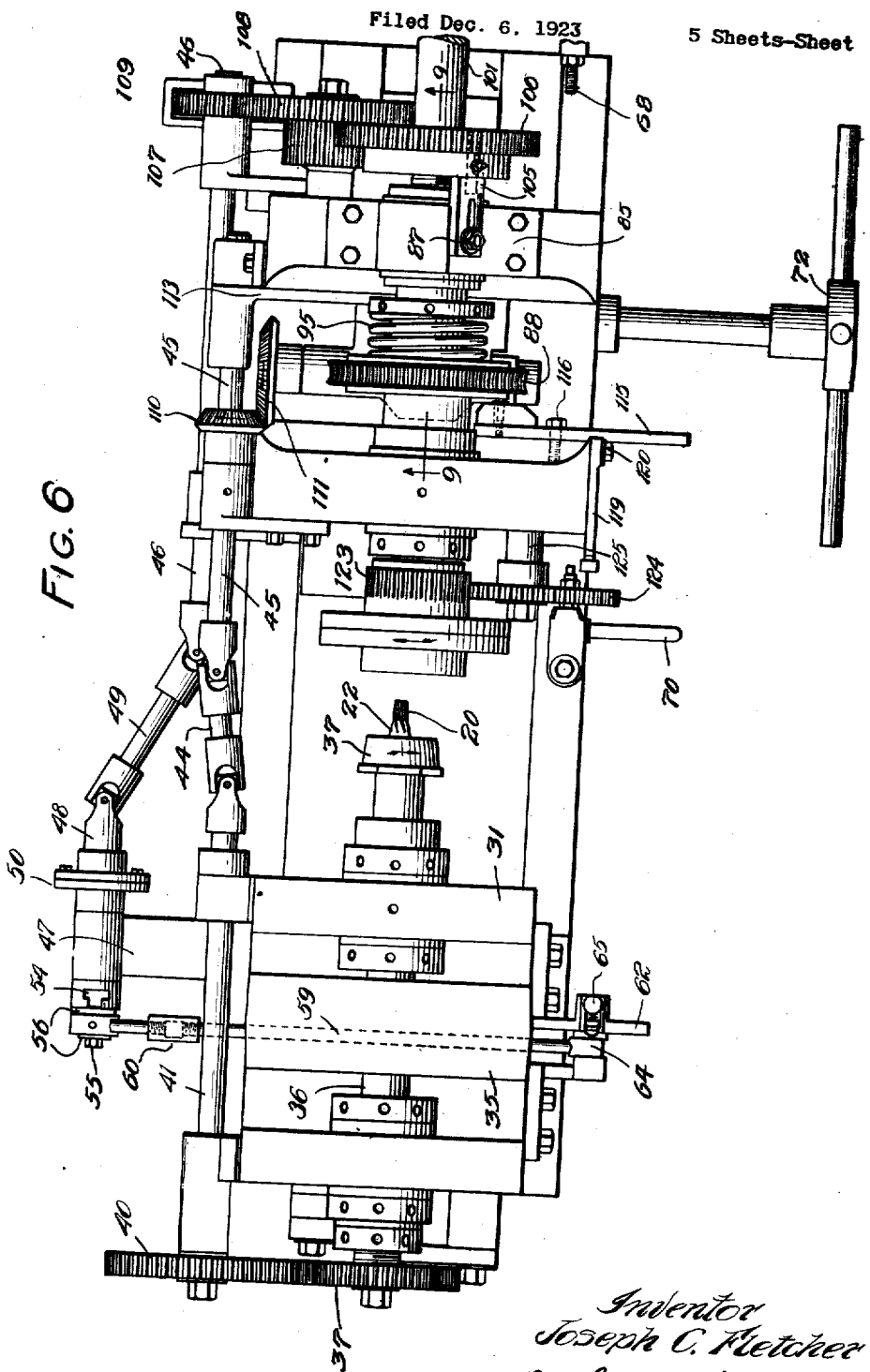
Fig. 6 is a plan view of the same.

On the frame of the machine is the bracket 47 (Figs. 10 and 6) with the shaft 48 bearing therein. A universal 49 is used to connect shaft 48 to shaft 46 in this instance, because the two are out of line. The two flanges 50 (Fig. 11) divide the shaft into two portions, bolted together by bolts 51, the slots 52 in the flanges permitting an axial adjustment of the two flanges. This forms an axially adjustable coupling by which is varied the phase relation of reciprocation of the slide 31 to the rotation of the die blank. The shaft 48 has a head 53 at the other end with a T-slot 54 diametrically therethrough. In the slot is a headed bolt 55, with the sleeve and collar 56, washer 57, and nut 58. By these clamping means the location of the bolt is made variably eccentric as is required, thus constituting bolt 55 as a radially adjustable crank pin.

I next provide means for transforming the eccentricity into reciprocation of the tool-carrying slide 31 over a given path and also means to quickly displace the path of the reciprocation of the slide so as to move the tool out of thread-cutting relation with the inserts of the blank. For this purpose I use a connecting rod or link 59 with a sort of turn-buckle connector 60 therein for semi-permanent adjustments. With the turn buckle device various sizes of dies may be threaded without changing the hob or milling cutter. One end of link 59 is pivoted about the sleeve 56 having the eccentric motion. On the head 31 is a bracket 61 facing the operator. Rigid therewith is a circular dial 62. Through the bracket and dial passes a shaft 63 having an eccentric portion 64 and a lever and handle 65. A locking pin 66 is adapted to lock the lever in position in holes 67 about the periphery of the dial 62. The eccentric 64 receives the remaining end of the link 59. It is readily seen by reference to Fig. 10, that a movement of the handle 65 through 180° serves to vary the effective length of the rod 59 by an amount equal to the eccentricity of 64. It is this arrangement which readily offsets the tool 24 out of cutting relation to the inserts on the die.

As a result of the above described arrangement certain advantageous features become inherent with a machine employing any construction producing the same kind of stroke as does the above mechanism. It is obvious that with rotation of the shaft 48 the tool is never horizontally stationary. With reference to a constant speed for the shaft 48, its motion is a simple harmonic displacement between the limits of its travel. During one half of a completed cycle the motion in one direction varies from nearly imperceptible motion, through a maximum speed slowing down to imperceptible motion before reversal of direction. By adjustment of the axial relation of the flange couplings 50, the amount of displacement of the tool during the passage of an insert may be varied without changing the length of the stroke. By the adjustability of the flange coupling the relief can be reversed from the direction shown. Such would be required in making a die for a left-hand thread as will be hereinafter set forth. In other words, the flange coupling permits variation in the phase angle of reciprocation and rotation. While the above adjustments may be made through the flange couplings 50, it may also more readily be made by sliding the pin 55 in its T-slot 54 to vary the displacement of the tool. By sliding the pin past the center of the T-slot the machine will be adapted to cut the left hand threads.

The work slide of the machine designated generally by the numeral 33 serves to hold the rotating work, to feed it axially and automatically to control itself in important respects. For example, I desire to provide an impositive power drive in order that the machine will not function and thus be damaged if it should become jammed. Likewise it is desirable to provide automatic means to disengage the power at the end of the feed, and a mechanism to prevent feeding during rotation.

With certain fine threads I have found that the relief on the hob teeth is sufficient to accommodate the helical angle of lead of the inserts in a horizontal position of the die axes. However for coarse threads an angular adjustment is provided to effect cutting with the desired helical angle. I provide means for varying the angularity of the work axis and rotary tool axis. This adjustment is incorporated preferably in the head about to be described.

The head stock which I employ is in two parts 33 and 33ª. The latter is a base member slidable on the ways 34 between suitable stops 66, 67 and 68. In Fig. 4 a detailed view of stop 66 is shown. This stop is to provide a preliminary stop for the setting of the slide in starting position. It is held in a pivoted member 69 with a throw handle 70. The dotted lines show it in its inoperative position.

Figure 7:
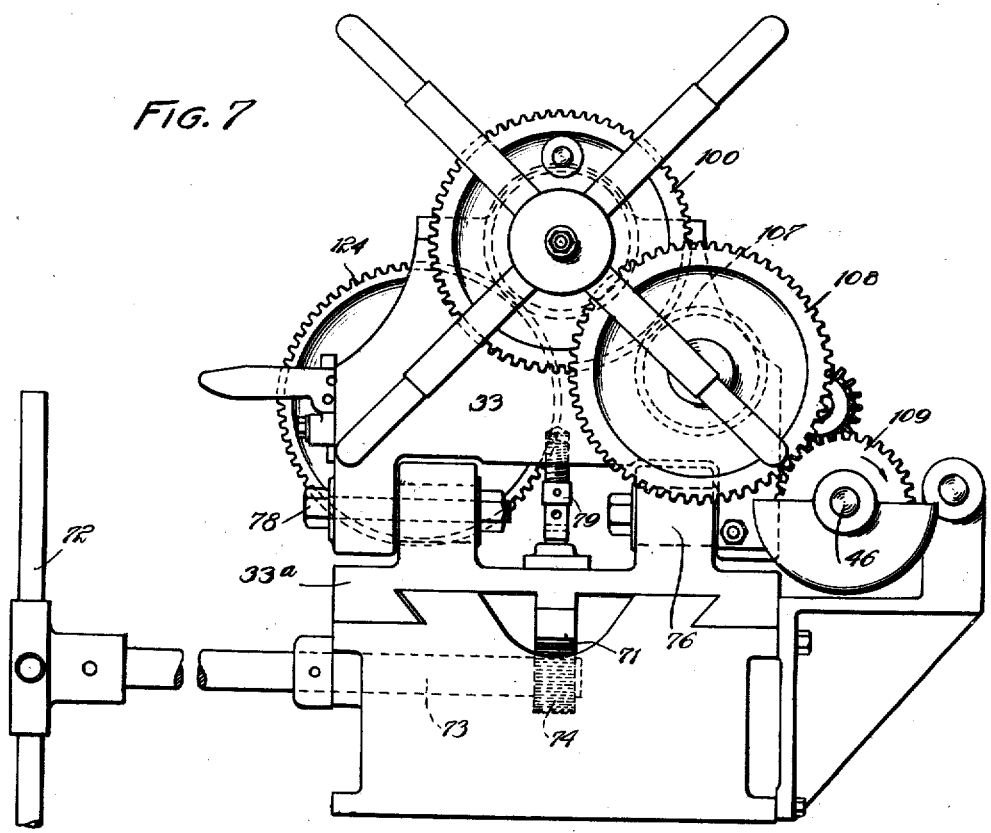
Fig. 7 shows a right end view of the machine as positioned in Fig. 5.

The base 33ª (Fig. 7) has a rack 71 on the under side by which the hand wheel 72 feeds the table through shaft 73 carrying pinion 74. The upper portion 33 is pivoted to the base 33ª through the line 75. Upright ears 76 on the base 33 have arcuate slots 77 therein through which pass the bolts 78 in the head 33 for clamping the same in its adjusted position. The jack screw 79 between 33 and 33ª serves to change the angularity of the work with respect to the axis of the tool in order to vary the helical angle in the die. In the present embodiment the back end of 33 is lowered for right hand threads and raised for left hand threads. When this angular position is used the remaining parts of the machine are set so that the die and rotary tool cut an insert in a horizontal plane. However, it is not necessary that the adjustment be in a vertical plane, other arrangements being equally practicable having due regard for the position of the cutter with reference to the die in the particular machine embodying the invention.

The upper head 33 is provided with two bearings 80 and 81 for a main spindle 82. This spindle is integral from the end carrying a chuck 83 for the work to the end having a handwheel 84. The spindle is slidable in the bearing 80, through the feeding means in the other bearing. The bearing 81 has a removable cap 85 within which is a split nut 86 locked thereto as by a screw pin 87. On the rotating spindle a threaded portion is provided, which is adapted to feed the spindle by engagement with the split nut 86. The means by which this is accomplished is so associated with the general construction of the whole mechanism that the latter will be described as a whole.

The impositive drive which I prefer to use for the spindle 82 comprises a positively driven worm gear 88 having friction material connected therewith. Cork plugs 89 have proven suitable for this purpose. The worm gear 88 is normally free to turn between flange plates 90 and 91. On the shaft 82 between the bearings 80 and 81 is a sleeve 92 splined to the shaft at 93. The flange 90 is keyed fixedly to the sleeve 92 against a shoulder thereon. A loose collar 94 about the sleeve 92 carries the worm gear 88 and the flange 91. A compression spring 95 forces the flange plates 90 and 91 to receive power through the cork plugs 89 by frictional contact, an adjustable nut 96 varying the compression of the spring by its position on the threaded end 97 of sleeve 92.

The feeding mechanism and the power transmission to the reciprocating mechanism for the tool slide have a common relation and will be described together. Loose on the spindle 82 I provide a threaded sleeve 98 integral with a head portion 99. The sleeve 98 and the split nut 86 determine the pitch of the die to be cut. The hand wheel 84 is removable to permit replacing the sleeve 98 and nut 86 with a set of a different pitch.

The head 99 fits within a gear 100 keyed to the shaft. A sleeve 101, unitary with the handwheel, is also keyed to the shaft, the nut 102 fixing all in compact relation.

When the shaft 82 rotates the gear 100 likewise rotates, but feeding will not take place till the head 99 is positively connected to a rotating member. I prefer to do this by engaging the head 99 with the gear 100 by means of the slidable pin 103 situated within the head. A knob or pin 104 secured in the pin 103 serves to move it in and out of engagement in gear 100. When it is disengaged from the gear, friction may cause feeding, so that I have provided a slidable block 105 (Figs. 5 and 6) on the bearing cap 85. A hole in the block retains the pin and the clamping nut 106 holds the block fixed in place. A suitable train of gears 107—108—109 transmits power from the gear 100 to the shaft 46 connected to the eccentric mechanism of the tool slide. The gear 109 is splined onto the shaft 46 to permit the longitudinal motion of slide 33. The ratio from gear 100 to shaft 46 is 1 to $n$ where $n$ is the number of inserts in the blank.

The means for transmitting power to the gear 88 is adapted for automatic disengagement at the end of the feeding stroke.

Figure 8:
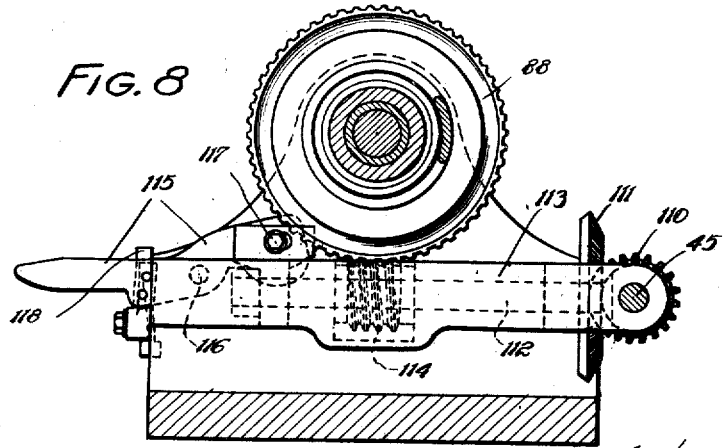
Fig. 8 shows a view towards the plane of line 8—8 in Fig. 5.

One manner in which I accomplish this is as follows: As has been stated above the shaft 45 (Figs. 5—6—8) furnishes the power to the work slide. A bevel gear 110 on the shaft 45 meshes with a bevel gear 111 on a shaft 112. The gear 110 is splined onto the shaft in order that the shaft may slide therethrough in the movements of the base 33 on its ways. A swinging arm or bracket 113 is pivoted about the shaft 45 so as to carry the shaft 112 within the same, while permitting continuous engagement of the bevel gearing. A worm screw 114 on the shaft 112 engages the worm gear 88 when the arm is raised to the position shown in Fig. 8.

Ordinarily the weight of the bracket 113 and its various parts is sufficient to draw it away from the gear 88, but if desired spring means may be added to draw it away. So in order to transmit power a lock is provided in the form of a lever 115 pivoted at 116 to the head 33. The lever and bracket member have a slot and pin connection 117 so that the lever 115 is a manual means to raise it into place. The weight of the bracket tends to raise the forward end of the lever 115 so that a lock 118 is placed over it to hold it in its depressed position. In order to release the lock automatically I have placed the same on a rocker 119 pivoted at 120. A spring pressed pin 121 tends to hold it in locked position. The rocker 119 has a leg and foot extension 122, the depressing of which will release the lock 118 to permit disengaging of the power.

In the machine as herein described I have used a hob of such length that two revolutions of the die blank are sufficient to complete the hobbing operation. This is clearly represented in Fig. 1. I desire to trip the locking means above described at the end of two rotations of the blank. For this purpose I place upon the spindle a gear 123, here made as a part of the chuck head. This is adapted to mesh with gear 124 to give a ratio of 1 to 2, this gearing being on a stub shaft 125 in the work slide. An adjustable pin 126 in this gear is arranged to trip the foot 122 to release the lock.

In operating the machine described, a blank is placed in the chuck 83 while the base 33 is moved towards the stop 68. When properly placed the die blank can be moved forward and the tool enters between two of the blank inserts. The hand wheel 72 is used to bring the work slide up to stop 66, its operating position, where it remains. The pin 103 is moved to engage the gear 100. During all this the tool is rotating and likewise the worm screw 114. The operating lever 115 is depressed to transmit power to the worm gear 88. Through the frictional contact, the spindle 82 revolves freely and quite rapidly until an insert arrives at the tool, when it may be slowed down somewhat by slippage in the friction elements. The rotation of the blank effects lateral reciprocation of the tool slide 31 through the gears 100, 107, 108, 109, shaft 46, universal 49, to shaft 48 and the eccentric pin 55. At the end of two revolutions of the blank the trip device 119 operates leaving the pin 104 (Fig. 5) in position to be moved towards and into the block 106 to stop feeding. On the cutter slide the lever 65 is turned manually to offset the tool to free it from engaging the inserts. The power is again set to rotate the blank, the dog 66 swung out, and the slide fed by hand wheel 72 onto the tool up to the stop 67 to chamfer the die. The chamfering is accomplished by the tapered cutting portion 22 of the tool 20, the thread cutting portions of the tool being offset from contact with the inserts. The reciprocation of the tool carrying slide 31 continues so that the chamfer likewise is relieved as well as the threads. The handwheel 84 is used to turn back the feed screw before repeating the operation.

However, the above is not the required sequence of operation. With the tool in the offset position the chamfering may be done first, then the hobbing.

It is now obvious that the principles disclosed are capable of combination in a variety of ways to produce a machine capable of quickly forming dies on a production basis. Additional well known automatic means may be incorporated in various embodiments of the invention, some of which have been described, in order to eliminate manual operations which the above described machine employs. However, these details form no part of my invention and the foregoing description is not to be construed as limiting my invention short of the prior art in view of the appended claims.

I claim as my invention:

1. A machine of the class described, comprising in combination a base, two carriages on said base movable at right angles to each other, a driving pulley carried by one of said carriages, a flexible power connection from said pulley to the other carriage, said connection including cut-off mechanism, a tool spindle on the pulley-carrying carriage, connected with said pulley, a work spindle on the other carriage controlled by the cut-off mechanism of said flexible power connection, and means to move both carriages by rotation of the work spindle.

2. In a die hobbing machine, a rotary tool comprising a hob portion and a larger tapered cutter portion, automatic means to feed a rotating die blank relatively onto the hob portion, means to move the tool and blank relatively whereby to free the hob portion of the tool from action on the die blank, and other means to feed the die blank relatively onto the cutter portion.

3. In a die hobbing machine, a rotary tool comprising a hob portion and a larger tapered cutter portion, means to produce relative feeding of a rotating die blank along the hob portion of the tool and into the path of the cutter portion, and means to move the tool and the blank relatively whereby to free the hob portion from action on the blank, while the larger tapered cutter portion remains effective on the blank.

4. In a die hobbing machine, a rotary tool comprising a hob portion and a tapered cutter portion, means to feed a rotating die blank onto the hob portion, means to offset the hob from cutting relation to the die, and other feeding means to feed the die blank onto the tapered cutter portion, whereby the chamfer is produced, the tool being capable of a reciprocatory motion normal to its axis in timed relation to the rotation of the blank, whereby the relief in the die is produced.

5. In a die hobbing machine, a rotary tool comprising a hob portion and a tapered cutter portion, means to produce relative feeding of a rotating die blank along the hob portion, means to offset the hob and die from cutting relation, and other feeding means to feed relatively the die blank and the tapered cutter portion, whereby the chamfer is produced, the tool and the work having a relative reciprocation normal to the axis of the tool in timed relation to the rotation of the blank, whereby relief in the cutter threads is produced.

6. In a machine of the character described, having a base with a carriage thereon carrying a cutter spindle, means to move the carriage transversely of the axis of the tool, comprising a rotary shaft rigid with the bed, an eccentric thereon, an adjustably fixed eccentric on the carriage, a link connecting said two eccentrics whereby rotation of the first eccentric reciprocates the carriage and whereby the shifting of the second eccentric shifts the carriage independently of the reciprocation.

7. In a machine for forming thread cutting tools, a rotary tool comprising a hob portion and a cutter portion of different diameter than the hob portion, means to produce relative feeding of the rotating blank along the hob portion, means to offset relatively the tool and the blank to bring the hob portion out of cutting relation with the blank and to keep the cutter portion in cutting relation to the blank, and means to feed the work on to the cutter portion.

8. In a die hobbing machine, a rotary tool-carrying spindle, a rotary work spindle, one of said spindles having a reciprocatory motion normal to its axis of rotation, said reciprocation being timed to the rotation of the work cut by the tool, and means to shift the tool in the direction of reciprocation independently thereof out of cutting relation with the work.

9. In a die hobbing machine of the class described, having a work spindle, and a tool slide, a power driven tool spindle on the tool slide, impositive drive connections from said tool spindle to the work spindle, positive drive connections from the work spindle to a mechanism adapted to reciprocate the tool carrying slide.

10. In a die hobbing machine of the class described, having a work spindle, and a tool slide, a power driven tool spindle on the tool slide, impositive drive connections from said tool spindle to the work spindle, positive drive connections from the work spindle to a mechanism adapted to reciprocate one of said slides perpendicular to the axis of its spindle.

11. In a die hobbing machine of the class described, having a work spindle, and a tool slide, a power driven tool spindle on the tool slide, impositive drive connections from said tool spindle to the work spindle, positive drive connections from the work spindle to a mechanism adapted to reciprocate the tool carrying slide, and separate means to disengage said two drive connections.

12. In a die hobbing machine of the class described, having a work slide with a spindle therein and a tool slide, a power driven tool spindle on the tool slide, impositive slide connections from said tool spindle to the work spindle, positive drive connections from the work spindle to a mechanism adapted to reciprocate one of said slides, and separate means to disengage said two drive connections.

13. In a machine of the class described having a base and a movable slide on said base, a reciprocating mechanism for said slide, comprising a rotary shaft axially fixed relative to the base, an axially adjustable coupling in said shaft, a radially adjustable crank pin extending from the end of said shaft, an eccentric element on the slide, means to turn said element on an axis parallel to the rotary shaft, and a connecting rod between the crank pin and the eccentric element.

14. In a machine of the class described having a base and a movable slide on said base, a reciprocating mechanism for said slide comprising a rotary shaft fixed relative to the base, an axially adjustable coupling on said shaft, a radially adjustable crank pin extending from the end of said shaft, a connecting rod from said crank pin to the slide, and means to vary the effective length of said connecting rod.

15. In a machine of the class described having a laterally reciprocatory rotary tool, a work slide, comprising a positively driven shaft, a main spindle, a rotary member impositively connected to said spindle, means to engage the driven shaft with said rotary member, a feed nut and screw device axially alined with said spindle, means to connect said feed device to said spindle, whereby the spindle is fed by the rotation thereof, and tripping means operated by a predetermined rotation of the spindle to disengage the driven shaft from the rotary member.

16. In a machine of the class described having a laterally reciprocatory rotary tool, a work head comprising a base portion slidable longitudinally of the machine, means to slide said base, an upper portion having pivotal connection with said base, whereby to permit angular adjustment relative to the axis of the rotary tool, a main spindle bearing in said upper portion, means to drive said spindle impositively, and means to feed said spindle by the rotation thereof with respect to the upper portion, the base remaining stationary, and mechanism operated by the rotation of the spindle adapted to be connected to mechanism for reciprocating said rotary tool.

17. In a machine of the class described having a rotary tool in one slide, and a rotary work spindle in another slide, rapid feeding means to move the spindle slide, mechanical feeding means to feed the spindle with respect to its slide, eccentric mechanism operated by the rotation of the spindle to reciprocate the tool slide, an impositive power transmission from the rotary tool to the work spindle, and automatic tripping means associated with said transmission to render it inoperative.

In testimony whereof, I have hereunto affixed my signature.

JOSEPH C. FLETCHER.

adapted to reciprocate one of said slides, and separate means to disengage said two drive connections.

13. In a machine of the class described having a base and a movable slide on said base, a reciprocating mechanism for said slide, comprising a rotary shaft axially fixed relative to the base, an axially adjustable coupling in said shaft, a radially adjustable crank pin extending from the end of said shaft, an eccentric element on the slide, means to turn said element on an axis parallel to the rotary shaft, and a connecting rod between the crank pin and the eccentric element.

14. In a machine of the class described having a base and a movable slide on said base, a reciprocating mechanism for said slide comprising a rotary shaft fixed relative to the base, an axially adjustable coupling on said shaft, a radially adjustable crank pin extending from the end of said shaft, a connecting rod from said crank pin to the slide, and means to vary the effective length of said connecting rod.

15. In a machine of the class described having a laterally reciprocatory rotary tool, a work slide, comprising a positively driven shaft, a main spindle, a rotary member impositively connected to said spindle, means to engage the driven shaft with said rotary member, a feed nut and screw device axially alined with said spindle, means to connect said feed device to said spindle, whereby the spindle is fed by the rotation thereof, and tripping means operated by a predetermined rotation of the spindle to disengage the driven shaft from the rotary member.

16. In a machine of the class described having a laterally reciprocatory rotary tool, a work head comprising a base portion slidable longitudinally of the machine, means to slide said base, an upper portion having pivotal connection with said base, whereby to permit angular adjustment relative to the axis of the rotary tool, a main spindle bearing in said upper portion, means to drive said spindle impositively, and means to feed said spindle by the rotation thereof with respect to the upper portion, the base remaining stationary, and mechanism operated by the rotation of the spindle adapted to be connected to mechanism for reciprocating said rotary tool.

17. In a machine of the class described having a rotary tool in one slide, and a rotary work spindle in another slide, rapid feeding means to move the spindle slide, mechanical feeding means to feed the spindle with respect to its slide, eccentric mechanism operated by the rotation of the spindle to reciprocate the tool slide, an impositive power transmission from the rotary tool to the work spindle, and automatic tripping means associated with said transmission to render it inoperative.

In testimony whereof, I have hereunto affixed my signature.

JOSEPH C. FLETCHER.

Certificate of Correction.

It is hereby certified that in Letters Patent No. 1,613,577, granted January 4, 1927, upon the application of Joseph C. Fletcher, of Chicago, Illinois, for an improvement in "Die-Cutting Machines," errors appear in the printed specification requiring correction as follows: Page 2, line 7, for the word "presented" read *presenting*, and line 115, for the word "looking" read *locking;* page 5, line 126, claim 12, for the word "slide" read *drive;* and that the said Letters Patent should be read with these corrections therein that the same may conform to the record of the case in the Patent Office.

Signed and sealed this 1st day of February, A. D. 1927.

[SEAL.]

M. J. MOORE,
*Acting Commissioner of Patents.*

Certificate of Correction.

It is hereby certified that in Letters Patent No. 1,613,577, granted January 4, 1927, upon the application of Joseph C. Fletcher, of Chicago, Illinois, for an improvement in "Die-Cutting Machines," errors appear in the printed specification requiring correction as follows: Page 2, line 7, for the word "presented" read *presenting*, and line 115, for the word "looking" read *locking;* page 5, line 126, claim 12, for the word "slide" read *drive;* and that the said Letters Patent should be read with these corrections therein that the same may conform to the record of the case in the Patent Office.

Signed and sealed this 1st day of February, A. D. 1927.

[SEAL.]

M. J. MOORE,
*Acting Commissioner of Patents.*